June 4, 1935.  G. BOZZER ET AL  2,003,626
UNIVERSAL MEASURING INSTRUMENT
Filed March 27, 1934   3 Sheets-Sheet 1
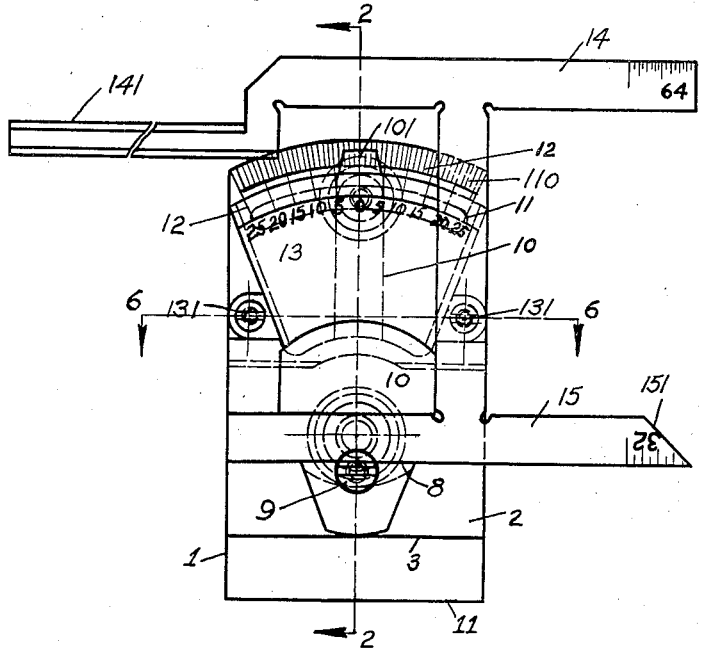
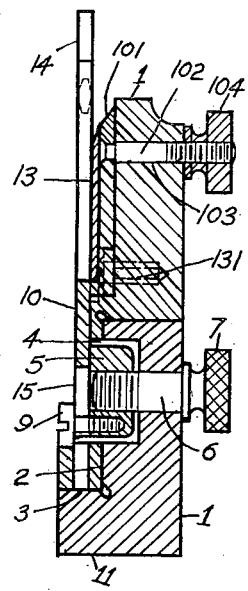
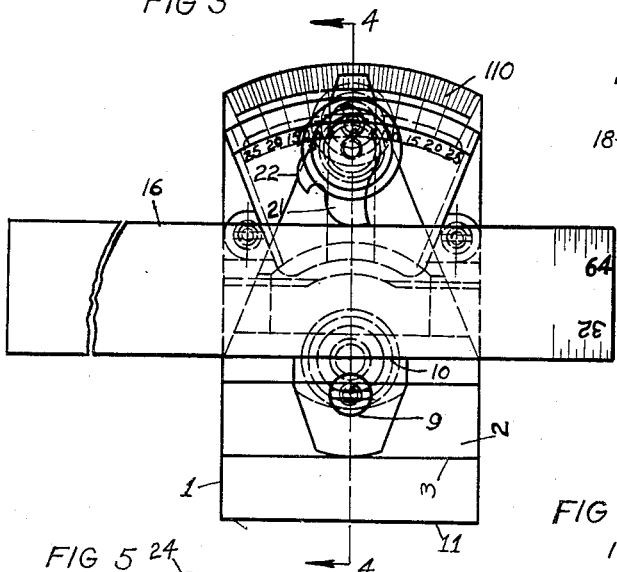
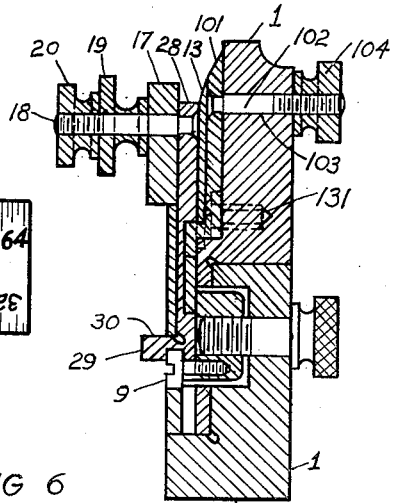
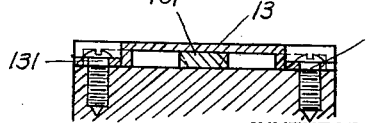
INVENTORS
George Bozzer
Julius Habersin June 4, 1935.   G. BOZZER ET AL   2,003,626
UNIVERSAL MEASURING INSTRUMENT
Filed March 27, 1934   3 Sheets-Sheet 2
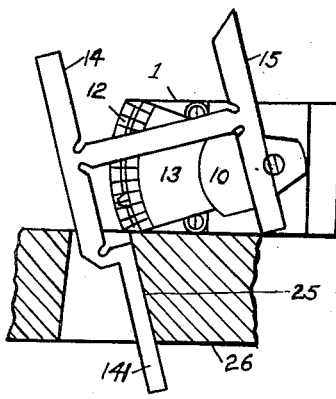
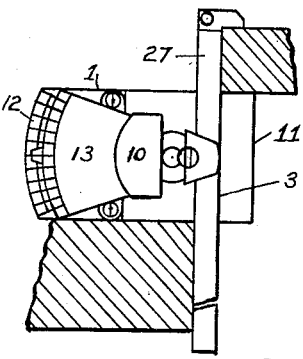
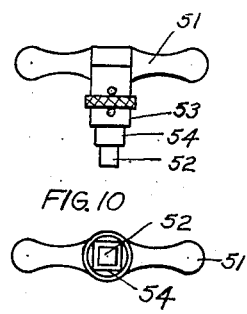
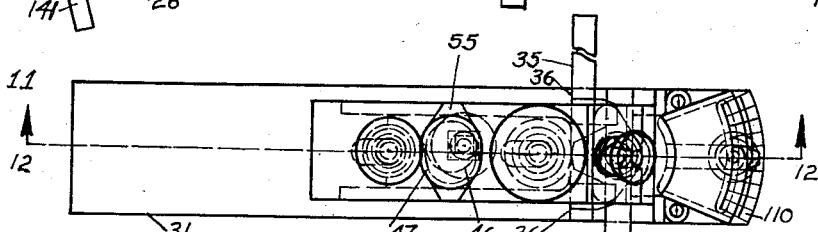
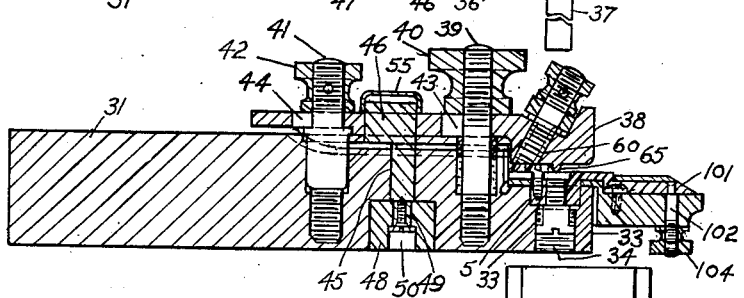
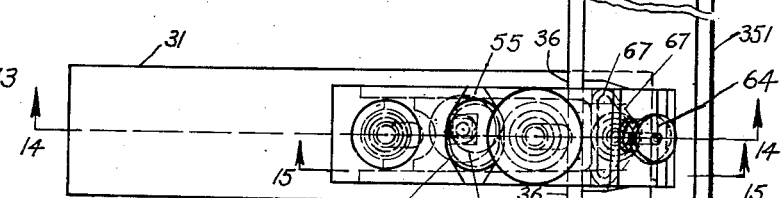
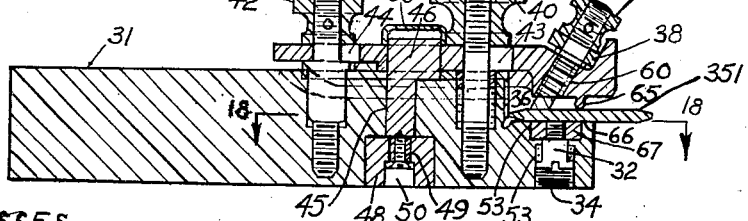

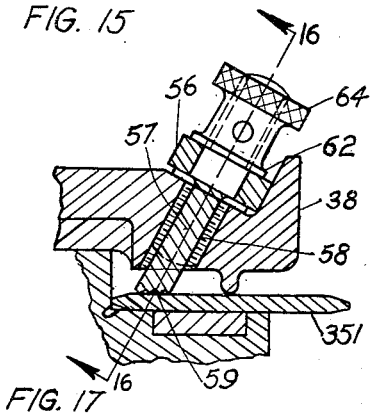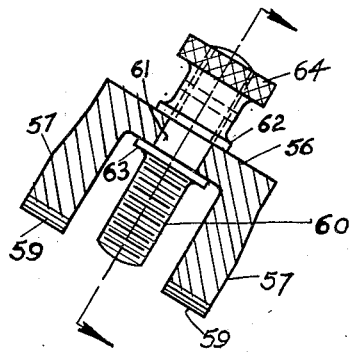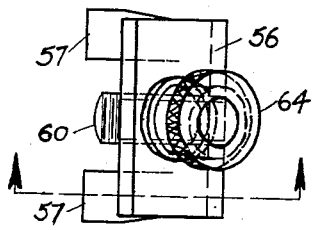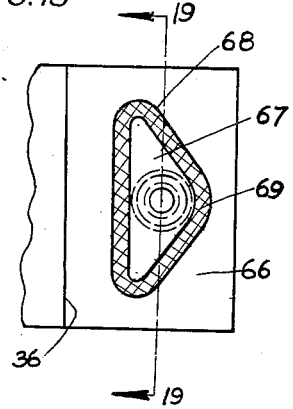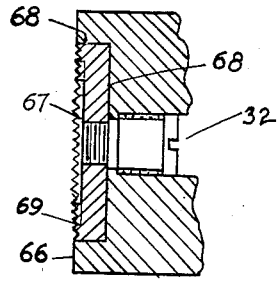

Patented June 4, 1935

2,003,626

UNITED STATES PATENT OFFICE 2,003,626

UNIVERSAL MEASURING INSTRUMENT

George Bozzer and Julius Habersin, Detroit, Mich.

Application March 27, 1934, Serial No. 717,630

6 Claims. (Cl. 33—75)

Our invention relates to universal measuring instruments and its principal object is to provide a set of standard component parts which may be assembled in various ways so as to provide means for laying out, measuring, and checking work pieces of practically all of the various shapes and forms which are met with in regular tool-room and machine-shop practice.

Another object of our said invention is to provide an instrument of the character referred to which is adapted for use with graduated and ungraduated rules, scales, and straight edges of various lengths and widths such as are commonly found in a tool-maker's or machinist's kit, so that a workman already possessing a standard kit of tools may, by adding thereto a set of our special component parts, put himself in a position to lay out, measure, and check an endless variety of work pieces without the use of the numerous expensive special instruments which are at present necessary in order to meet the exigencies of modern tool-room work.

A further object of our said invention is to provide a universal instrument of the character referred to which is simple in construction, having regard to the multifarious purposes to which it may be applied, and which is so constructed that its various forms of assembly may be effected in an accurate and dependable manner without the necessity of more than ordinary skill on the part of the operator.

With these and other objects in view, the invention consists in the improved construction, arrangement, and combination of parts which will be hereinafter fully described, reference being had to the accompanying drawings, which illustrate a preferred embodiment thereof, in which drawings—

Figure 1 is a plan view of the protractor section of our improved instrument shown in combination with a special multiple purpose scale, the various uses of which will be explained hereinafter.

Figure 2 is a section on line 2—2 of Figure 1 with the exception of the scale which is shown complete in elevation.

Figure 3 is a plan view of the protractor section shown in combination with an ordinary graduated rule together with a special rule-gripping cam.

Figure 4 is a section on line 4—4 of Figure 3.

Figure 5 is a plan view of the cam.

Figure 6 is a minor detail to be hereinafter referred to.

Figure 7 is a diagram showing a common application of the protractor section in combination with the special multiple purpose scale.

Figure 8 is a diagram illustrating a combination of the protractor section with a common type or hook rule.

Figure 9 is a side elevation of a special wrench adapted for use with our improved instrument.

Figure 10 is an underside view of the same.

Figure 11 is a plan view showing the protractor section mounted upon a special base and combined with parallel scales of the ordinary type.

Figure 12 is a section on line 12—12 of Figure 11.

Figure 13 is a plan view showing the special base above referred to without the protractor section but combined with a wide parallel scale of the ordinary type, the whole being adapted for laying out and checking ninety degree jobs.

Figure 14 is a section on line 14—14 of Figure 13.

Figure 15 is a fragmentary section on line 15—15 of Figure 13, drawn to an enlarged scale, illustrating a clamping member, designated 38, to be hereinafter referred to.

Figure 16 is a section on line 16—16 of Figure 15.

Figure 17 is a plan view of said clamping member.

Figure 18 is a fragmentary section on line 18—18 of Figure 14, drawn to an enlarged scale showing more clearly the construction of the adjustable support, to be hereinafter referred to.

Figure 19 is a section on line 19—19 of Figure 18.

Like characters designate corresponding parts throughout the several views.

Our improved instrument comprises in its general organization three essential features as follows:—

Firstly, a scale holder provided with means for holding scales of various types and sizes in different positions for use on ninety degree jobs.

Secondly, a protractor section to be used in conjunction with the scale holder and adapted to hold scales at various angles to the central axis of the said holder as determined by a graduated scale of degrees.

Thirdly, a base adapted to support the scale holder with or without the protractor section, the said base being furnished in relatively large or small sizes according to the class of work to be handled.

The scale holder and the protractor section will now be described with particular reference to Figures 1, 2, 3 and 4. 1 is the body of the scale holder, in general of rectangular cross section, and provided with a transverse recess 2 adjacent its rear end 11 bounded on one side by a vertical wall 3, the bottom of the recess and the face of the wall being accurately ground or lapped at right angles with the longitudinal axis of the body. Immediately forward of the recess 2 is a circular cavity 4 adapted to receive a hub 5 which is arranged concentrically therewith and rotatably mounted upon the screw 6, the said screw fitting within the threaded bore of the hub and having a plain portion journaled in the body as shown, while outside of the body is a knurled head 7 by which the screw may be manually rotated. Upon the upper surface of the hub 5 is a projecting portion 8 against which a scale of any kind may be set and held in position by a screw 9. Upon the hub 5 is also provided an arcuate member 10 arranged concentrically with the axis of the screw 6 and provided with a pointer 101 which co-acts with graduations 110 representing angles of various degrees, the said graduations being marked upon the body 1. The member 10, together with its pointer, is held in position by a cover 13 having lugs for the reception of screws 131 by which it is secured to the body 1, as shown more clearly in Figure 6 which is a section on line 6—6 of Figure 1, the pointer sliding freely between the body and the cover and being locked in any desired position by the bolt 102 which is riveted to the pointer and passes through an arcuate slot 103 so that it may be set at any desired angle, after which the thumb nut 104 is tightened, thereby securing the pointer in place.

In order to facilitate the setting of the parts to various angles, there are provided auxiliary graduations 12 upon the edge of the cover 13. From this description it will be understood that a scale of any kind being set up against the surface 8 and clamped in position by the screw 9 may, by moving the member 10 about the center of the screw 6, be set at various angles as determined by the position of the pointer 101.

In the example illustrated in Figures 1 and 2 there is shown a special type of scale which forms part of the present invention and which is provided with a pair of graduated arms 14, 15 arranged in parallel spaced relation, the arm 15 being provided with a bevelled edge 151 and the arm 14 having an offset portion 141 of relatively narrow width, the use of which will appear later.

In the example shown in Figures 3 and 4, the scale holder is shown in conjunction with a parallel scale 16 which may be of any desired length and of various standard widths. In this arrangement there is superposed upon the cover 13 a member 28, the said member being held in place by being tightly fitted over the upper portion of the member 10, adjacent the hub 5, and further secured by the screw 9, the head of which engages in a slot in its rear end. Upon the rear end of the member 28 is a projecting ridge 29, the surface 30 of which is ground accurately to provide an aligning surface for the scale 16. In order to hold the scale against this surface and lock the same in position, there is provided a cam 17 which is rotatably mounted upon the pin 18, the said pin being held stationary in the member 28 by riveting or other means, and rotation of the cam is effected manually by the knurled head 19 spot-welded or otherwise secured to the same, the parts being locked in the desired position in a rotary sense by the clamping nut 20 upon the threaded end of the pin 19.

The cam 17 in the example shown is provided with four projections 21, 22, 23, 24, each of the said projections having a different radius so that the cam may be employed to clamp four different widths of standard scales or blades such as the ½ inch, ½ inch, ⅝ inch, and ¼ inch. Any of these scales in the example shown may be set at various angles up to twenty-five degrees on either side of the longitudinal axis of the body 1, as will be understood by reference to the plan view Figure 3. In Figures 7 and 8 are shown two examples illustrating the use of the scale holder, Figure 7 showing the combination with the special scale, as in Figures 1 and 2, as applied to the checking of a bevelled surface 25 in a work piece 26, while Figure 8 shows the checking of a right angled job by means of a standard hook rule 27 held in the transverse recess 2, and in contact with the wall 3. By reference to Figure 7 it will be observed that the narrow offset portion upon the arm 14 of the special scale would be very useful where the opening in the piece to be measured was relatively narrow.

In the arrangement shown in Figures 11 and 12 the scale holder, together with the protractor section, is mounted on a base 31. This base is of similar construction at its forward end to that of the base 1 previously described, that is to say, it has an opening for the reception of the hub 5 of the protractor and also an arcuate slot for the reception of the locking bolt 102, as well as the necessary graduations 110 which co-act with the pointer 101. The protractor, as a whole, is of the same construction throughout as described with reference to Figures 1 and 2 with the exception that in place of the pivotal screw 6 therein shown, we employ a special form of screw 32. This screw is secured tightly in the hub 5 and is normally pressed downwards by a small helical spring 33 so as to yieldably press the hub in a downward direction and maintain the pointer 101 in frictional contact with its seat upon the base. The amount of friction between the parts may be varied by turning the screw-plug 34 which is threaded into the base and is capable of being forced upwards against the head of the screw 32, as will be understood.

In the arrangement now under discussion we have shown a narrow scale 35 which is arranged for use on right-angled work, being secured against the vertical face 36 upon the base, this face occupying a position, relative to the axis of the hub 5, similar to that of the face 3 in Figure 1. We have also shown a narrow scale 37 which is secured to the surface 8 of the protractor section by the screw 9 in the same way as shown in Figures 1 and 2, by reference to which it will be noted that this latter scale may be set to various angles as determined by the position of the pointer 101.

It will be observed that the base 31 may in some cases be made of very large dimensions for use upon work of greater magnitude than usual, and in such cases the right-angled scale 35 might also be of considerable length and relatively heavy. In order, therefore, to provide a more substantial and more accurately adjustable means for securing the scale in position against the accurately ground mating edge 36 upon the base, there is provided a special clamping arm 76

38 which is secured to the upper face of the base 31 by a forward bolt 39 fixed in the base and having a clamping nut 40 and by a rear bolt 41 also fixed in the base and having the clamping nut 42. These bolts engage in slots 43, 44 in the arm 38 so that the latter is capable of sliding longitudinally in relation to the base, such sliding movement being effected by means of a pin 45 pivotally mounted in the base and having at its upper end and excentric head 46 which engages in a transverse slot 47 in the arm, turning of the excentric being effected by means of a collar 48 secured to the lower end of the pin 45 by a screw 49, there being provided a square opening 50 in the collar which is adapted to receive a suitable key or wrench. The screw-plug 34 is also provided with a square opening, not shown, adapted for wrench operation.

In Figures 9 and 10 is illustrated a very convenient form of key or wrench, the body 51 of which is in general of T-shape having a stem or central portion 52 of square cross section adapted to fit within and engage the square opening in the screw-plug 34, while upon the said stem is arranged a sleeve 53 slidable longitudinally thereupon and terminating at its lower end in a squared portion 54 adapted to engage the square opening 50 in the collar 48. The sleeve 53 is normally in the position shown in Figure 9 but is capable of being slid downwards over the square portion 52 of the stem so that the square portion 54 is co-terminal therewith, at which time the squared portion 54 is in a position convenient for operating the collar 48 and with it the excentric 46. In order to protect the excentric 46 and prevent access of dirt into the slot 47, there is provided a cover 55 which is secured in position by spot-welding or other means.

In Figures 13 and 14 the base 31 is shown in conjunction with a relatively wide and heavy scale 351 referred to above, and in order to properly hold this scale as well as the narrow scale 35 tightly against the face 36 upon the base, there is provided upon the clamping arm 38 a member 56 having a pair of jaws 57, shown more in detail in Figures 15, 16, and 17, adapted to slide in inclined grooves 58 in the member 38 and provided at their lower ends with serrations 59 adapted to frictionally engage the scale 35 or 351, as the case may be, and, due to its inclined position relative to the surface of the scale, to force the same downwardly and rearwardly so as to force it into proper alignment with the said face 36. Downward movement of the jaws 57 is effected by means of the screw 60 which engages in a tapped hole in the arm 38 and is journaled in the member 56, as indicated at 61, and provided with collars 62, 63 in such manner that by rotation of the knurled head 64 the member 56 is moved upwards or downwards as required. Upon the undersurface of the arm 38 is provided a downwardly projecting ridge 65 which presses upon the scale 351 and serves to keep it in engagement with the face 66 of the base 31. It will be observed that since the scales used with our improved instrument will, for the most part, be hardened, great care must be taken to ensure that no slip occurs between the said scales and the parts with which they are held in contact. In order, therefore, to augment the gripping action there is provided an equalizer member 67, shown more in detail in Figures 18 and 19, which occupies a recess 68 in the face 66 and is provided with a serrated portion 69 upon which the scale 351 rests. The member 67 is mounted upon the screw 32 hereinbefore referred to, by rotation of which it may be raised and lowered through a slight distance, so that the member 67 can teeter around the end of the screw and thus equalize the pressure between it and the serrated member 57 upon the upper side of the scale. Thus, by proper manipulation of the member 56 and the member 67 and at the same time rotating the excentric 46, a very perfect adjustment of the scale 351 is provided, so that it is properly aligned with the face 36 upon the base 31.

While we have hereinbefore described and shown a preferred embodiment of our said invention, it will be readily understood by those skilled in the art to which the invention relates that the same may be modified in various ways to suit any particular or peculiar requirement without departing from the spirit of our invention.

Having thus described our said invention, what we claim and desire to secure by Letters Patent of the United States is:

1. An instrument of the character described comprising a body having an arcuate portion having graduations thereupon, a pivot concentric therewith, a member swingably mounted upon said pivot and having a pointer adapted to register with said graduations for adjustment to various angles relative to said body, a facing projecting from said body at right angles to the longitudinal axis of the same and adapted to co-act with a scale, means for holding said scale in contact with said facing, a facing upon said swingable member adapted to co-act with a scale, and means for holding said last-mentioned scale in contact with said last-mentioned facing, whereby said last-mentioned scale may be adjusted to various angles relative to the longitudinal axis of said body.

2. An instrument of the character described comprising a body having an arcuate portion having graduations thereupon, a pivot concentric therewith, a member swingably mounted upon said pivot and having a pointer adapted to register with said graduations for adjustment to various angles relative to said body, a facing projecting from said body at right angles to the longitudinal axis of the same and adapted to co-act with a scale, means for holding said scale in contact with said facing, a facing upon said swingable member adapted to co-act with a scale, and cam means for holding said last-mentioned scale in contact with said last-mentioned facing, whereby said last-mentioned scale may be adjusted to various angles relative to the longitudinal axis of said body.

3. An instrument of the character described comprising a body having an arcuate portion having graduations thereupon, a pivot concentric therewith, a member swingably mounted upon said pivot and having a pointer adapted to register with said graduations for adjustment to various angles relative to said body, a facing projecting from said body at right angles to the longitudinal axis of the same and adapted to co-act with a scale, means for holding said scale in contact with said facing, a facing upon said swingable member adapted to co-act with a scale, and a cam pivoted upon said swingable member and having a plurality of cam surfaces of varying radius whereby scales of varying width may be held in contact with said last-mentioned facing, whereby said last-mentioned scale may be adjusted to various angles relative to the longitudinal axis of said body.

4. An instrument of the character described comprising a base having an arcuate portion having graduations thereupon, a pivot concentric therewith, a member swingably mounted upon said pivot and having a pointer adapted to register with said graduations for adjustment to various angles relative to said body, a facing projecting from said body at right angles to the longitudinal axis of the same and adapted to co-act with a scale, means for holding said scale in contact with said facing, a facing upon said swingable member adapted to co-act with a scale, and means for holding said last-mentioned scale in contact with said last-mentioned facing, whereby said last-mentioned scale may be adjusted to various angles relative to the longitudinal axis of said body.

5. An instrument of the character described comprising a base having a facing projecting from the same at right angles to its longitudinal axis, a scale adapted to co-act with said facing, and means for holding said scale in contact with said facing, said means including an arm slidably mounted upon said base, eccentric means for moving said arm longitudinally of said base, a pair of opposed grooves in said arm disposed at an angle to said facing and to the upper surface of said base, and a member slidably adjustable in said grooves and adapted to frictionally engage said scale and to press the same simultaneously against said facing and said surface.

6. An instrument of the character described comprising a base having a facing projecting from the same at right angles to its longitudinal axis, a scale adapted to co-act with said facing and said base, and means for holding said scale in position, said means including an adjustable equalizing member upon the upper surface of said base adapted to support said scale, an arm slidably mounted upon said base and overhanging said member, a pair of opposed grooves in said arm disposed at an angle to said facing and to said upper surface, and a member slidably adjustable in said grooves and adapted to frictionally engage said scale and to press the same simultaneously against said facing and said equalizing member.

GEORGE BOZZER.
JULIUS HABERSIN